United States Patent [19]
Catherwood et al.

[11] Patent Number: 5,457,802
[45] Date of Patent: Oct. 10, 1995

[54] INTEGRATED CIRCUIT PIN CONTROL APPARATUS AND METHOD THEREOF IN A DATA PROCESSING SYSTEM

[75] Inventors: Michael I. Catherwood; Brian M. Millar; Linda R. Nuckolls, all of Austin, Tex.

[73] Assignee: Motorola, Inc., Schaumburg, Ill.

[21] Appl. No.: 61,474

[22] Filed: May 17, 1993

[51] Int. Cl.$^6$ .................................................. G06F 13/16
[52] U.S. Cl. .......................... 395/775; 395/287; 395/309
[58] Field of Search .................................... 395/275, 425, 395/325, 164, 775

[56] References Cited

U.S. PATENT DOCUMENTS

| | | | |
|---|---|---|---|
| 5,056,041 | 10/1991 | Guttas et al. | 395/164 |
| 5,089,951 | 2/1992 | Iijima | 395/275 |
| 5,212,775 | 5/1993 | Bikowsky et al. | 395/325 |
| 5,230,067 | 7/1993 | Buch | 395/275 |
| 5,291,425 | 3/1994 | Nagaishi | 395/425 |
| 5,339,395 | 8/1994 | Pickett et al. | 395/325 |
| 5,347,643 | 9/1994 | Kondo et al. | 395/425 |

OTHER PUBLICATIONS

"Microprocessor, Microcontroller and Peripheral Data, vol. II," Motorola, 1988, pp. iii; 3–1310 through 3–1311.
"MC68340: Integrated Processor with DMA User's Manual," Motorola, 1992, pp. 3–44.
"M6805 HMOS/M146805 CMOS Family Microcomputer/Microprocessor User's Manual," Motorola, pp. 206; 210.
HC11–M68HC11 Reference Manual, Motorola, pp. 2–35 through 2–36.
James P. Muccioli, et al., "Radiated Emissions of Very Large Scale Integrated Circuits," IEEE 1990, pp. 292–298.
Donald R. J. White, et al., Interference Control Technologies, Inc., "Taming EMI in Microprocessor Systems," IEEE Dec. 1985, pp. 30–37.
Intel Microcontroller Handbook 1986, pp. i; 7–4 through 7–9.

Primary Examiner—Gopal C. Ray
Assistant Examiner—David A. Wiley
Attorney, Agent, or Firm—Susan C. Hill

[57] ABSTRACT

A data processing system (10) having address pins (30), data pins (31), control pins (32), chip select pins (33), and other pins (34). For bus cycles of an instruction which do not require use of an external address bus (35), the values driven by the address pins (30) are "frozen" in their previous logic state. The previous logic state is determined by the most recent value driven by address pins (30) during a bus cycle that required use of the external address bus (35). Data pins (31) may be "frozen" in the same manner as address pins (30). Control pins 32, chip select pins 33, and other pins 34 may be driven to their respective inactive logic states. The goal is to reduce noise and power consumption by reducing the voltage level switching taking place on external conductors (35–39).

17 Claims, 4 Drawing Sheets

EXAMPLE USING A SEQUENCE OF TWO INSTRUCTIONS

| ASSEMBLY CODE | HEXADECIMAL CODE | COMMENTS |
|---|---|---|
| STA $0100, X | FDFF D7 01 00 | STORE THE CONTENTS OF ACCUMULATOR REGISTER A IN MEMORY USING INDEXED ADDRESSING MODE (2-BYTE OFFSET). FOR THIS EXAMPLE:<br>X = $00<br>A = $FF<br>PC = $FDFF<br>OPCODE = $D7<br>$FDFF IS AN EXTERNAL ADDRESS<br>$0100 IS AN INTERNAL ADDRESS |
| RTS | FE02 81 | RETURN FROM SUBROUTINE FOR THIS EXAMPLE:<br>SP = $00FD<br>OPCODE = $81 |

*FIG.3*

| INSTRUCTION BUS CYCLE | | VALUES DRIVEN ON PRIOR ART ADDRESS PINS | | VALUES DRIVEN ON PRIOR ART DATA PINS | |
|---|---|---|---|---|---|
| STA | 1 | OP CODE ADDRESS | $FDFF | OP CODE | $D7 |
|  | 2 | OP CODE ADDRESS+1 | $FE00 | OFFSET (HIGH BYTE) | $01 |
|  | 3 | OP CODE ADDRESS+2 | $FE01 | OFFSET (LOW BYTE) | $00 |
|  | 4 | $xxFE:xx=OFFSET (HIGH) | $01FE | DATA AT $xxFE | $FF |
|  | 5 | INDEX REGISTER+OFFSET | $0100 | CURRENT OPERAND DATA | $00 |
|  | 6 | INDEX REGISTER+OFFSET | $0100 | OPERAND DATA | $FF |
| RTS | 1 | OP CODE ADDRESS | $FE02 | OP CODE | $81 |
|  | 2 | OP CODE ADDRESS+1 | $FE03 | NEXT OPCODE | $FF |
|  | 3 | STACK POINTER | $00FD | DATA AT SP | $00 |
|  | 4 | STACK POINTER+1 | $00FE | RETURN ADDRESS (HIGH BYTE) | $FC |
|  | 5 | STACK POINTER+2 | $00FF | RETURN ADDRESS (LOW BYTE) | $04 |
|  | 6 | NEW OPCODE ADDRESS | $FC04 | NEW OPCODE | $C6 |

*FIG.4*
−PRIOR ART−

| INSTRUCTION BUS CYCLE | | VALUES DRIVEN ON ADDRESS PINS 30 | | VALUES DRIVEN ON DATA PINS 31 | |
|---|---|---|---|---|---|
| STA | 1 | OP CODE ADDRESS | $FDFF | OP CODE | $D7 |
|  | 2 | OP CODE ADDRESS+1 | $FE00 | OFFSET (HIGH BYTE) | $01 |
|  | 3 | OP CODE ADDRESS+2 | $FE01 | OFFSET (LOW BYTE) | $00 |
|  | 4 | LAST ADDRESS | $FE01 | LAST DATA | $00 |
|  | 5 | LAST ADDRESS | $FE01 | LAST DATA | $00 |
|  | 6 | LAST ADDRESS | $FE01 | LAST DATA | $00 |
| RTS | 1 | OP CODE ADDRESS | $FE02 | OP CODE | $81 |
|  | 2 | OP CODE ADDRESS+1 | $FE03 | NEXT OPCODE | $FF |
|  | 3 | LAST ADDRESS | $FE03 | LAST DATA | $FF |
|  | 4 | LAST ADDRESS | $FE03 | LAST DATA | $FF |
|  | 5 | LAST ADDRESS | $FE03 | LAST DATA | $FF |
|  | 6 | NEW OPCODE ADDRESS | $FC04 | NEW OPCODE | $C6 |

*FIG.5*

INTEGRATED CIRCUIT PIN CONTROL APPARATUS AND METHOD THEREOF IN A DATA PROCESSING SYSTEM

FIELD OF THE INVENTION

The present invention relates in general to an integrated circuit pin, and more particularly to an integrated circuit pin control apparatus and method thereof in a data processing system.

BACKGROUND OF THE INVENTION

Integrated circuits are being used in an ever increasing variety of application (e.g. computers, communications equipment, automobiles, consumer electronics, etc.). Many of the applications require integrated circuits which produce a minimal amount of electromagnetic noise and which consume a minimal amount of power.

It is common for a data processing system or a portion of a data processing system, which is implemented on an integrated circuit, to have address pins which are capable of being coupled to an external address bus, and to have data pins which are capable of being coupled to an external data bus. Some data processing systems also have control pins, chip select pins, and other types of integrated circuit pins which are also capable of being coupled to conductors that are external to the data processing system.

Unfortunately, however, when integrated circuit pins are coupled to external conductors, it is possible for a large number of the conductors to switch from one logic state to another logic state at approximately the same time. For example, the conductors for the external address and data buses may switch from mostly ones to mostly zeros at approximately the same time.

This switching of the external bus conductors from one voltage level to another voltage level produces a significant amount of electromagnetic interference (EMI) emissions, which are generally referred to as noise. In some applications, such as automobile electronics and communications electronics, the electromagnetic interference can be a significant problem. In fact, many applications using integrated circuits require the noise produced by EMI emissions to be reduced as much as possible.

Because many integrated circuits today operate in the megahertz frequency range, the noise produced by EMI emissions from many integrated circuits is in the radio frequency range. Noise in the radio frequency range is especially problematic when the application using the integrated circuit involves communications, such as radios, pagers, cellular phones, etc.

In addition, the capacitive charging and discharging of the external bus conductors may consume a significant amount of power. And reducing the power consumed by integrated circuits is becoming very important as more and more products become portable and use a battery as a power source (e.g. portable computers, pagers, portable telephones).

Some prior art integrated circuits tri-state their outputs (i.e. place the outputs in a high-impedance state) in order to reduce noise and power consumption when the corresponding external conductors are not being used. When an output is tri-stated, the voltage level on its corresponding external conductor is indeterminate. Unfortunately, however, some peripheral integrated circuits will not function properly if they are coupled to tri-stated outputs.

In order to accommodate peripherals which cannot handle tri-stated inputs, some integrated circuits drive all of their outputs to a predetermined voltage level when the corresponding external conductors are not being used. For example, some integrated circuits drive all of their outputs to the voltage level corresponding to a logic level one when the external conductors are not being used. Unfortunately, however, this approach produces more bus switching than the tri-state approach, and thus produces more noise and consumes more power.

SUMMARY OF THE INVENTION

The previously mentioned needs are fulfilled and other advantages achieved with the present invention. In one form, the present invention comprises an apparatus and a method for controlling an integrated circuit pin in a data processing system. The method includes the step of driving the integrated circuit pin with a first value during both a first bus cycle and a second bus cycle if the data processing system is in a first mode, and if no external bus access is required during the second bus cycle. The method also includes the step of driving the integrated circuit pin with the first value during the first bus cycle and with a second value during the second bus cycle if the data processing system is in the first mode, and if a first external bus access is required during the first bus cycle and a second external bus access is required during the second bus cycle.

The present invention will be understood by one skilled in the art from the detailed description below in conjunction with the accompanying drawings.

DESCRIPTION OF THE PREFERRED EMBODIMENT

The present invention can be used to reduce the amount of electromagnetic noise produced by integrated circuits which are coupled to external conductors. In addition, the present invention can be used to reduce the amount of power consumed by integrated circuits which are coupled to external conductors.

The present invention can reduce noise and power consumption by reducing the switching which takes place on external bus conductors. In addition, the present invention can be used with peripheral integrated circuits which will not function properly if they are coupled to tri-stated outputs. The present invention also enables a customer to completely eliminate any external bus activity (and the associated noise and power consumption) by using software which operates solely out of internal memory.

One or more internal bus cycles are required to execute each instruction in a data processing system. The present invention determines which bus cycles of an instruction require use of the external conductors, and which bus cycles of an instruction do not require use of the external conductors. Note that some instructions do not require use of the external conductors at all; some instructions require use of the external conductors only for some of the bus cycles; and other instructions require use of the external conductors for all of the bus cycles. For example, bus cycles which reference internal address locations do not require use of the external conductors. Likewise, bus cycles which are used to perform internal effective address calculations do not require use of the external conductors.

For bus cycles of an instruction which do not require use of the external conductors, the values driven by the integrated circuit pins in the present invention are "frozen" in their previous logic state; and thus the external conductors continue to be driven with the same logic state. For example, assume that the present bus cycle requires use of the external conductors and drives a $00 on the external data bus conductors and an $FF on the external address bus conductors. If the next bus cycle does not require the use of the external conductors, then during the next bus cycle, the integrated circuit pins continue to drive a $00 on the external data bus conductors and an $FF on the external address bus conductors. Thus the switching of the external bus conductors from one voltage level to another voltage level is reduced. Reducing the switching on the external conductors reduces the noise generated and the power consumed by the integrated circuit.

However, there are times when it is not desirable to "freeze" the external buses in their previous state. For example, during emulation and testing it is often desirable to reflect all internal bus activity on the external conductors for every bus cycle, even during bus cycles which do not require use of the external conductors. The external bus is therefore not frozen so that internal bus cycles can continuously be observed by way of the integrated circuit pins. Thus under some circumstances, it is desirable to occasionally and selectively "freeze" the external buses; and under other circumstances, it is desirable never to "freeze" the external buses.

The present invention uses a user programmable control bit to determine whether or not the external buses will be selectively "frozen", or will instead always reflect the state of the internal buses. When the internal bus visibility option is enabled, such as during emulation, all internal bus activity is reflected on the external buses and the external buses are never "frozen". When the internal bus visibility option is disabled, such as during normal operation, the external buses remain frozen in their previous state during bus cycles which do not require use of the external conductors.

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one.

The term "bus" will be used to refer to a plurality of signals which may be used to transfer one or more various types of information, such as data, addresses, control, or status. The symbol "$" preceding a number indicates that the number is represented in its hexadecimal or base sixteen form.

DESCRIPTION OF THE FIGURES

Figure 1:
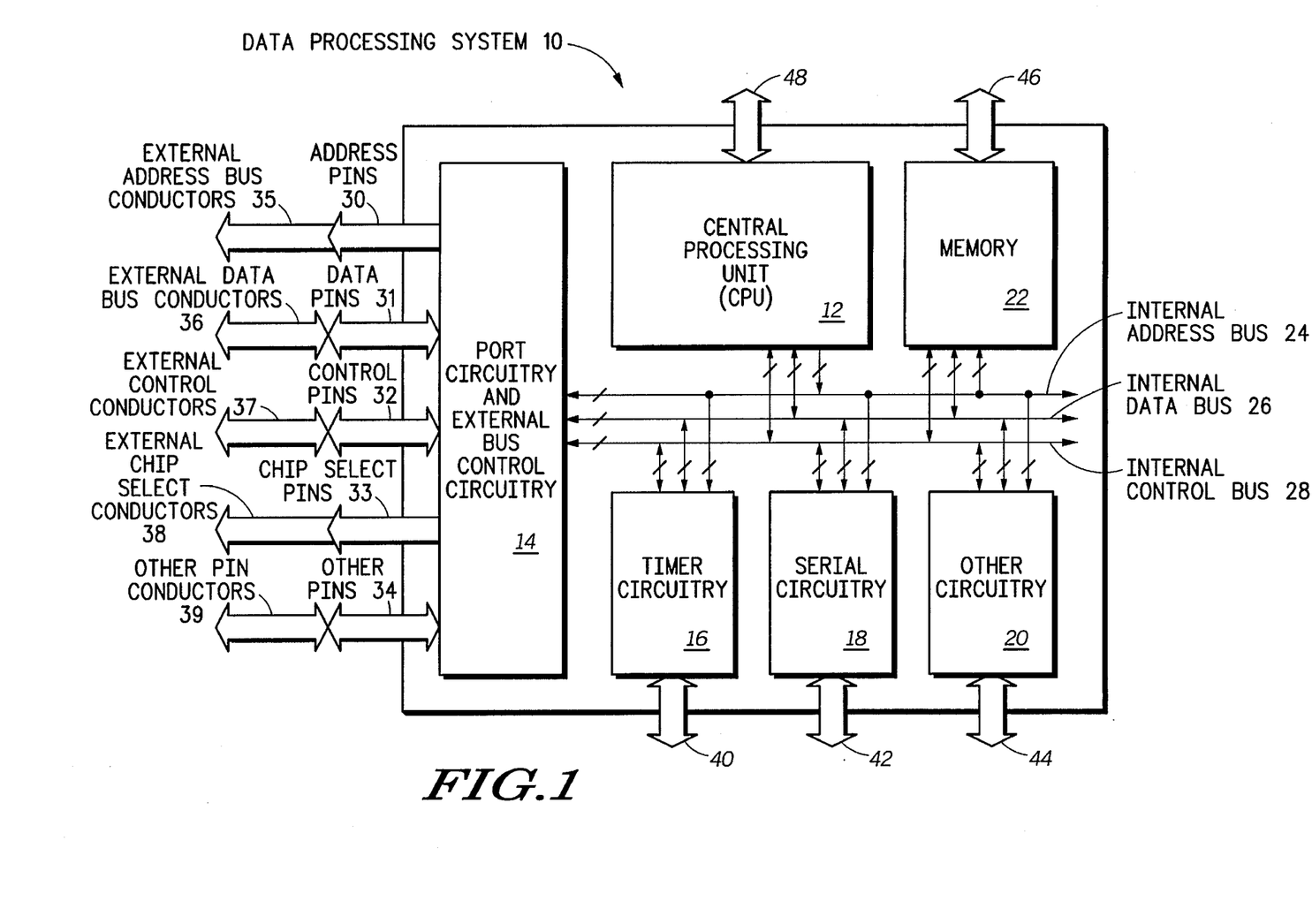
FIG. 1 illustrates, in block diagram form, a data processing system 10 in accordance with one embodiment of the present invention.

FIG. 1 illustrates a data processing system 10. The particular embodiment of data processing system 10 illustrated in FIG. 1 has a central processing unit (CPU) 12, port circuitry and external bus control circuitry 14, timer circuitry 16, serial circuitry 18, other circuitry 20, and memory circuitry 22, each of which is coupled to internal address bus 24, to internal data bus 26 and to internal control bus 28. In the particular embodiment of data processing system 10 illustrated in FIG. 1, internal data bus 26 and internal control bus 28 are bi-directional, and internal address bus 24 is uni-directional with CPU 12 providing the address values to internal address bus 24. In alternate embodiments of the present invention, each of the internal buses 24, 26, and 28 may be uni-directional or bi-directional.

Port circuitry and external bus control circuitry 14 is coupled to address integrated circuit pins 30, to data integrated circuit pins 31, to control integrated circuit pins 32, to chip select integrated circuit pins 33, and to other integrated circuit pins 34. In the particular embodiment of data processing system 10 illustrated in FIG. 1, data pins 31 are bi-directional, and control pins 32 and other pins 34 include some pins which are inputs and some pins which are outputs. In alternate embodiments of the present invention, each of the integrated circuit pins 30–34 may be uni-directional input pins, uni-directional output pins, or bi-directional input/output pins.

Optionally, address pins 30 may be coupled to external address bus conductors 35. Optionally, data pins 31 may be coupled to external data bus conductors 36. Optionally, control pins 32 may be coupled to external control conductors 37. Optionally, chip select pins 33 may be coupled to external chip select conductors 38. Optionally, other pins 34 may be coupled to other pin conductors 39. In the particular embodiment of the present invention illustrated in FIG. 1, external data bus conductors 36 are bi-directional, and external control conductors 37 and other pin conductors 39 include some bus signals which are inputs and some bus signals which are outputs. In alternate embodiments of the present invention, each of the external conductors 35–39 may include uni-directional input signals, uni-directional output signals, or bi-directional input/output signals.

Optionally, timer circuitry 16 may be bi-directionally coupled to integrated circuit pins 40. Optionally, serial circuitry 18 may be bi-directionally coupled to integrated circuit pins 42. Optionally, other circuitry 20 may be bi-directionally coupled to integrated circuit pins 44. Optionally, memory 22 may be bi-directionally coupled to integrated circuit pins 46. Optionally, CPU 12 may be bi-directionally coupled to integrated circuit pins 48.

CPU 12 includes several registers (not shown), such as index register X, accumulator register A, program counter register PC, and stack pointer register SP.

Figure 2:
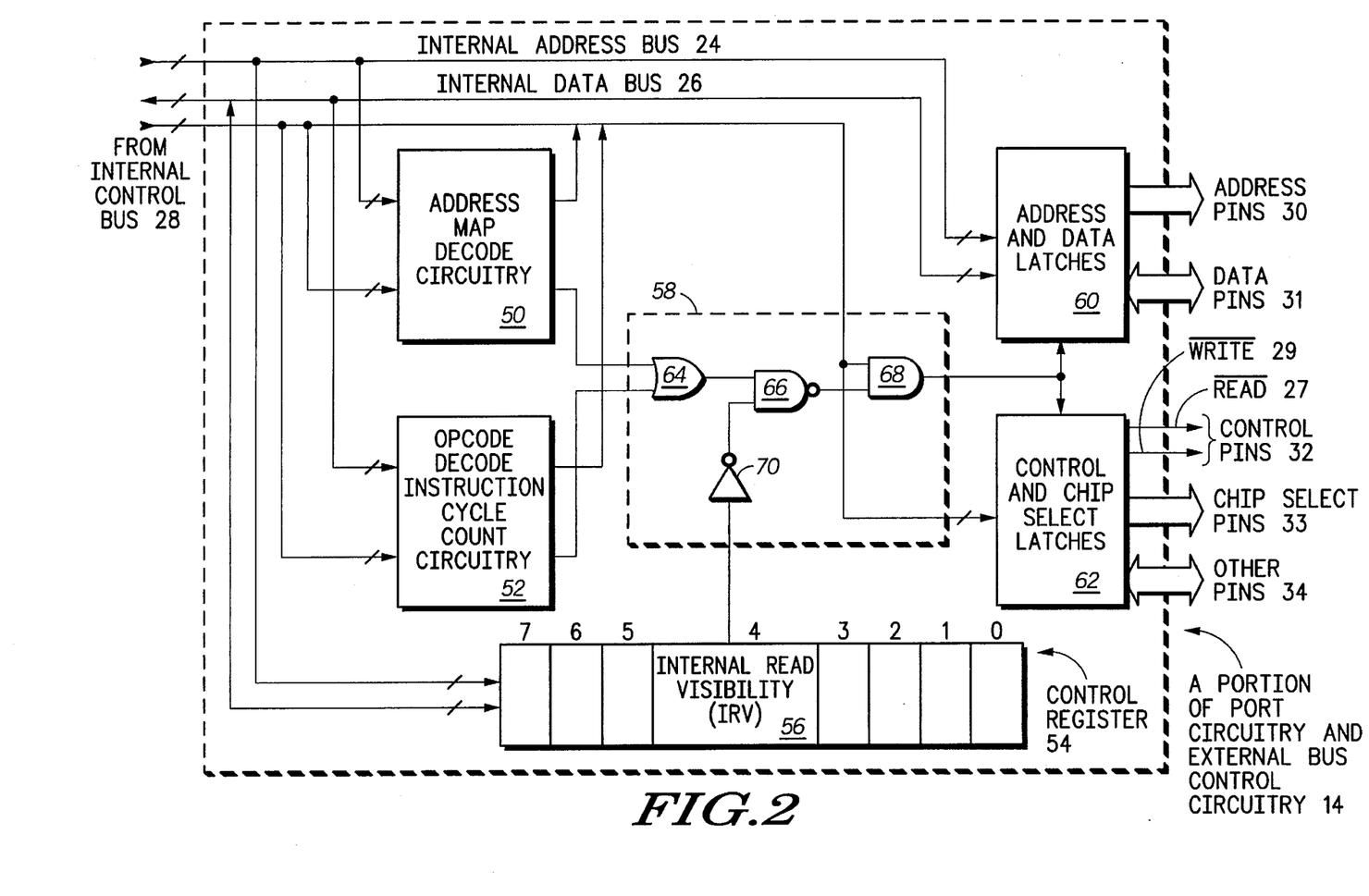
FIG. 2 illustrates, in combination block and logic diagram form, a portion of port circuitry and external bus control circuitry 14 of FIG. 1 in accordance with one embodiment of the present invention.

FIG. 2 illustrates a portion of port circuitry and external bus control circuitry 14 of FIG. 1. Address map decode circuitry 50 is coupled to internal address bus 24 and to internal control bus 28. Opcode decode and instruction cycle count circuitry 52 is coupled to internal data bus 26 and to internal control bus 28.

Control register 54 is coupled to internal address bus 24 and is bi-directionally coupled to internal data bus 26 so that control register 54 can be read and written. In the illustrated implementation of the present embodiment, control register 54 is an 8-bit register. Alternate embodiments of the present invention may have any number of bits in control register 54. Bit location four in control register 54 is an Internal Read Visibility (IRV) control bit. Alternate embodiments of the present invention may use one or more bits in a bit field at any bit location(s) to serve the same function as the IRV control bit 56.

Circuit 58 receives an input from address map decode circuitry 50, receives an input from opcode decode and instruction cycle count circuitry 52, receives an input from internal control bus 28, and receives an input from control register 54. Circuit 58 provides an output signal to a plurality of address and data latches 60 and to a plurality of control and chip select latches 62.

In one embodiment of the present invention, circuit 58 is implemented as illustrated in FIG. 2. Alternate embodiments of the present invention may use other circuitry to implement circuit 58. In FIG. 2, circuit 58 is implemented using an OR-gate 64, a NAND-gate 66, an AND-gate 68, and an inverter 70. A first input of OR-gate 64 is coupled to address map decode circuitry 50. A second input of OR-gate 64 is coupled to opcode decode and instruction cycle count circuitry 52. The IRV control bit is coupled to the input of inverter 70. The output of inverter 70 is coupled to a first input of NAND-gate 66. A second input of NAND-gate 66 is coupled to the output of OR-gate 64. The output of NAND-gate 66 is coupled to a first input of AND-gate 68. A second input of AND-gate 68 is coupled to internal control bus 28. The output of AND-gate 68 is coupled to a control input of a plurality of address and data latches 60. The output of AND-gate 68 is also coupled to a control input of a plurality of control and chip select latches 62.

The plurality of address and data latches 60 is coupled to internal address bus 24 and to internal data bus 26. The plurality of address and data latches 60 is also coupled to address pins 30 and to data pins 31. The plurality of control and chip select latches 62 is coupled to internal control bus 28. The plurality of control and chip select latches 62 is also coupled to control pins 32, to chip select pins 33, and to other pins 34. In one embodiment of the present invention, control pins 32 include a uni-directional output integrated circuit pin $\overline{READ}$ 27 and a uni-directional output integrated circuit pin $\overline{WRITE}$ 29. Control pins 32 also include other pins (not shown), such as a mode select pin. In alternate embodiments of the present invention, the $\overline{WRITE}$ pin 29 and the $\overline{READ}$ pin 27 may be bi-directional input/output pins.

Figure 3:
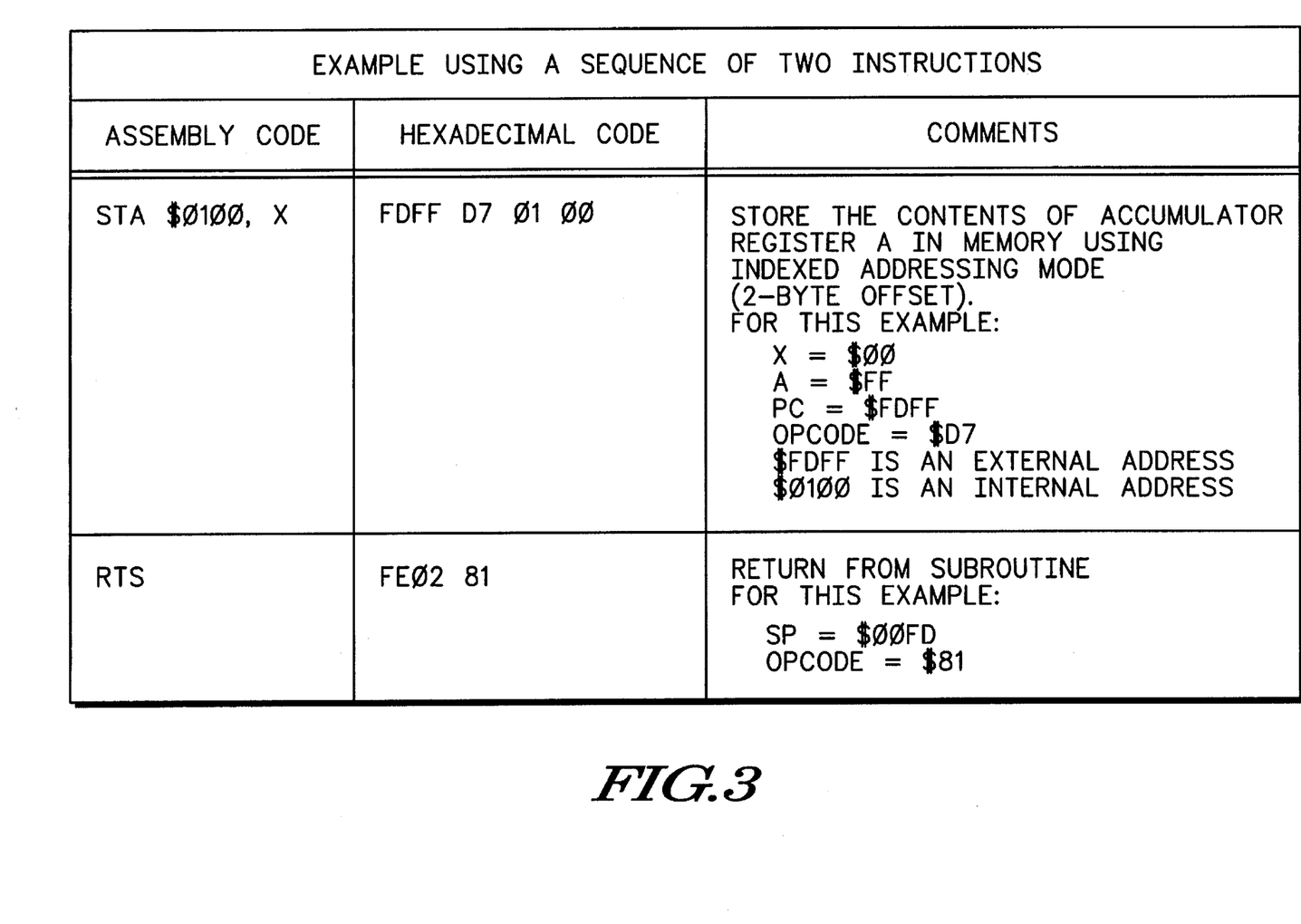
FIG. 3 illustrates, in tabular form, an example using a sequence of two instructions in accordance with one embodiment of the present invention.
Figure 4:
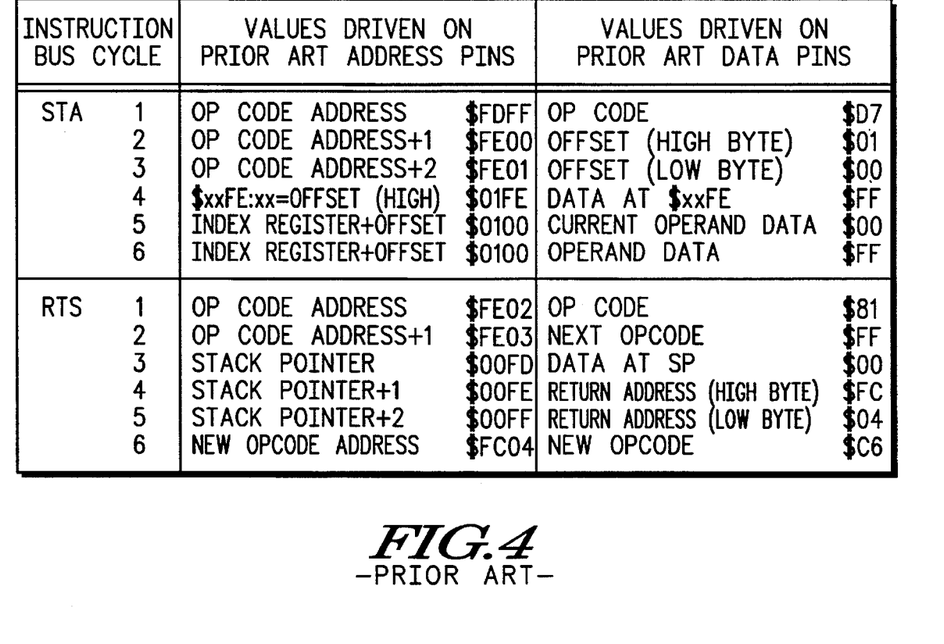
FIG. 4 illustrates, in tabular form, the response of a prior art data processing system to the instruction sequence in FIG. 3.
Figure 5:
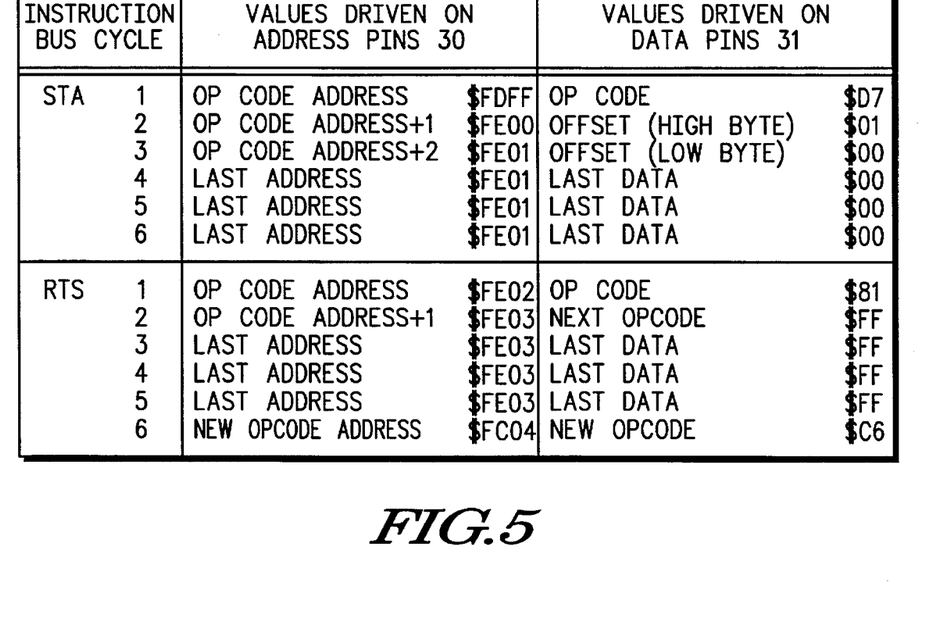
FIG. 5 illustrates, in tabular form, the response of a data processing system to the instruction sequence in FIG. 3 in accordance with one embodiment of the present invention.

FIGS. 3–5 use an example to illustrate an advantage of the present invention. FIG. 3 illustrates a sequence of two instructions which may be decoded and executed by CPU 12 in FIG. 1. FIG. 4 illustrates the response of a prior art data processing system to the instruction sequence in FIG. 3. FIG. 5 illustrates the response of one embodiment of data processing system 10 in FIG. 1 to the instruction sequence in FIG. 3.

Operation of a Preferred Embodiment

FIGS. 3–5 use an example to illustrate an advantage of the present invention. FIG. 3 illustrates a sequence of two instructions which may be decoded and executed by CPU 12 in FIG. 1. The first instruction is a store instruction "STA $0100, X" which stores the contents of accumulator register A in memory using indexed addressing mode (with a 2-byte offset $0100). For purposes of this example, index register X initially contains $00, the accumulator register A initially contains $FF, the program counter register PC initially contains $FDFF, the opcode of the store instruction is $D7, memory location $FDFF is an external address which is located external to data processing system 10, and memory location $0100 is an internal address which is located internal to data processing system 10, possibly within memory 22.

FIG. 4 illustrates the response of a prior art data processing system to the execution of the selected sequence of two instructions. The prior art data processing system has prior art integrated circuit address pins which correspond to address pins 30 of the present invention (see FIG. 1). Likewise, the prior art data processing system has prior art integrated circuit data pins which correspond to data pins 31 of the present invention. FIG. 5 illustrates the response of one embodiment of data processing system 10 to the execution of the selected sequence of two instructions.

Referring to the execution of the store instruction "STA" illustrated in FIG. 5, the first three bus cycles of the store instruction are used to retrieve the store instruction from external storage circuitry (not shown), which is coupled to data processing system 10 by way of address pins 30 and data pins 31.

During the first bus cycle of the store instruction, the value $FDFF stored in the program counter register PC is driven by data processing system 10 onto the external address bus conductors 35 by way of address pins 30. The opcode value $D7 for the store instruction is received back by data processing system 10 from the external storage circuitry (not shown) by way of external data bus conductors 36 and data pins 31. Data processing system 10 then internally increments the program counter register PC.

During the second bus cycle of the store instruction, the value $FE00 (i.e. the present value stored in the program counter register PC) is driven by data processing system 10 onto the external address bus conductors 35 by way of address pins 30. The value $01 (i.e. the high byte of the offset value for the store instruction) is received back by data processing system 10 from the external storage circuitry (not shown) by way of external data bus conductors 36 and data pins 31.

During the third bus cycle of the store instruction, the value $FE01 (i.e. the present value stored in the program counter register PC) is driven by data processing system 10 onto the external address bus conductors 35 by way of address pins 30. The value $00 (i.e. the low byte of the offset value for the store instruction) is received back by data processing system 10 from the external storage circuitry (not shown) by way of external data bus conductors 36 and data pins 31.

Thus for the first three bus cycles of the store instruction, use of the external address bus conductors 35, the address pins 30, the external data bus conductors 36, and the data pins 31 is required. Since use of the external address bus 35 is required, the values driven by the address pins 30 are not "frozen" in their respective logic state, but instead reflect the changing values on the internal address bus 24. Since use of the external data bus 36 is required, the values driven by the data pins 31 are not "frozen" in their respective logic state, but instead reflect the changing values on the internal data bus 26. As a result, for the first three bus cycles of the store instruction, the response (see FIG. 5) of one embodiment of data processing system 10 is the same as the response (see FIG. 4) of the prior art data processing system.

However, for the fourth, fifth, and sixth bus cycles of the store instruction, the response (see FIG. 5) of data processing system 10 is significantly different from the response (see FIG. 4) of the prior art data processing system. The fourth, fifth, and sixth bus cycles of the store instruction do not require use of the external address bus conductors 35, the address pins 30, the external data bus conductors 36, or the data pins 31.

Referring to the fourth, fifth, and sixth bus cycles of the store instruction illustrated in FIG. 5, since use of the external address bus 35 is not required, the values driven by the address pins 30 in the present invention are "frozen" in their respective logic states, and thus the external address bus conductors 35 continue to be driven with the same logic states and do not reflect the changing values on the internal address bus 24. Since use of the external data bus 36 is not required, the values driven by the data pins 31 are "frozen" in their respective logic states, and thus the external data bus conductors 36 continue to be driven with the same logic states and do not reflect the changing values on the internal data bus 26. Thus without tri-stating the address pins 30 and the data pins 31, the present invention can reduce noise and power consumption by reducing the switching which takes place on external address bus 35 and external data bus 36.

The fourth, fifth, and sixth bus cycles of the store instruction for the prior art and the present invention will now be discussed in more detail. Again, the fourth, fifth, and sixth bus cycles do not require use of the external address bus 35 or the external data bus 36. The fourth bus cycle is used for an effective address calculation internal to data processing system 10. The fifth and sixth bus cycles are used to access an address location $0100 which is internal to data processing system 10.

During the fourth bus cycle of the store instruction, an internal effective address calculation is completed by data processing system 10, and thus use of the external address bus 35 and the external data bus 36 is not required. The effective address calculation is used to determine the effective address value for the store instruction. The effective address value ($0100) for this particular store instruction is the summation of the value stored in the index register X ($00) and the two byte offset received as part of the instruction ($0100).

Referring to FIG. 4, note that the prior art data processing system drives the prior art address pins with the superfluous value $01FE, which happens to be the value of the prior art internal address bus during the fourth bus cycle. Likewise, the prior art data processing system drives the prior art data pins with the superfluous value $FF, which happens to be the value of the prior art internal data bus during the fourth bus cycle.

Referring to FIG. 5, during the fourth bus cycle of the store instruction in the present invention, data processing system 10 (see FIG. 1) continues to drive the address pins 30 with the value $FE01, which is the most recent value driven by the address pins 30 during a bus cycle that required use of the external address bus 35. Thus the address pins 30 of the present invention continue to drive the previous logic states. And therefore the external address bus conductors 35 continue to be driven with the same logical value, and not with a different and unnecessary value from internal address bus 24.

Likewise, during the fourth bus cycle of the store instruction in the present invention, data processing system 10 (see FIG. 1) continues to drive the data pins 31 with the value $00, which is the most recent value driven by the data pins 31 during a bus cycle that required use of the external data bus 36. Thus the data pins 31 of the present invention continue to drive the previous logic states. And therefore the external data bus conductors 36 continue to be driven with the same logical value, and not with a different and unnecessary value from internal data bus 26.

During the fifth and sixth bus cycles of the store instruction, data processing system 10 accesses an address location ($0100) which is internal to data processing system 10. Thus during the fifth and sixth bus cycles, use of the external address bus 35 and the external data bus 36 is not required. The access to an internal address location is used to complete the store instruction by transferring the value stored in accumulator register A to the location which was determined by the effective address calculation, namely internal address location $0100.

Referring to FIG. 4, during the fifth and sixth bus cycles of the store instruction, the prior art data processing system drives the prior art address pins with the superfluous value $0100. The value $0100 happens to be the value of the prior art internal address bus during the fifth and sixth bus cycles. Likewise, the prior art data processing system drives the prior art data pins with the superfluous value $00 during the fifth bus cycle, and with the superfluous value $FF during the sixth bus cycle. The value $00 happens to be the value of the prior art internal data bus during the fifth bus cycle, and the value $FF happens to be the value of the prior art internal data bus during the sixth bus cycle.

Referring to FIG. 5, during the fifth and sixth bus cycles of the store instruction in the present invention, data processing system 10 (see FIG. 1) continues to drive the address pins 30 with the value $FE01, which is the most recent value driven by the address pins 30 during a bus cycle that required use of the external address bus 35. Thus the address pins 30 of the present invention continue to drive the previous logic states. And therefore the external address bus conductors 35 continue to be driven with the same logical value, and not with a different and unnecessary value from internal address bus 24.

Likewise, during the fifth and sixth bus cycles of the store instruction in the present invention, data processing system 10 (see FIG. 1) continues to drive the data pins 31 with the value $00, which is the most recent value driven by the data pins 31 during a bus cycle that required use of the external data bus 36. Thus the data pins 31 of the present invention continue to drive the previous logic states. And therefore the external data bus conductors 36 continue to be driven with the same logical value, and not with a different and unnecessary value from internal data bus 26.

For the store instruction, the values driven by address pins 30 of the present invention (see FIG. 5) are sometimes the same as, and sometimes different from, the values driven by the prior art address pins (see FIG. 4). Likewise, the values driven by data pins 31 of the present invention (see FIG. 5) are sometimes the same as, and sometimes different from, the values driven by the prior art data pins (see FIG. 4). The values driven are the same during bus cycles that required use of the external address bus 35; the values driven may be different during bus cycles that do not required use of the external address bus 35.

The present invention can reduce the switching which takes place on external bus conductors, such as external address bus conductors 35 and external data bus conductors 36. For example, for the store instruction, all of the external address and data bus conductors in the prior art data processing system switch logic states between bus cycle three and bus cycle four. However, none of the external address bus conductors 35 and none of the external data bus conductors 36 in the present invention switch logic states between bus cycle three and bus cycle four. The present invention also reduces the total amount of switching which takes place on external bus conductors between bus cycles four, five, and six. Thus by reducing the overall amount of switching which takes place on external bus conductors, the present invention can reduce noise and power consumption.

The second instruction illustrated in FIG. 3 is a return from subroutine instruction "RTS". The "RTS" instruction increments the stack pointer register SP, and loads the contents of the byte of memory pointed to by the stack pointer register SP into the high byte of the program counter register PC. The "RTS" instruction requires six bus cycles to execute. For purpose of this example, the stack pointer register SP initially stores $00FD, and the opcode of the "RTS" instruction is $81.

Referring to the execution of the "RTS" instruction illustrated in FIG. 5, the first and second bus cycles of the "RTS" instruction are used to retrieve the "RTS" instruction and a subsequent instruction from external storage circuitry (not shown), which is coupled to data processing system 10 by way of address pins 30 and data pins 31.

During the first bus cycle of the "RTS" instruction, the value $FE02 stored in the program counter register PC is driven by data processing system 10 onto the external address bus conductors 35 by way of address pins 30. The opcode value $81 for the "RTS" instruction is received back by data processing system 10 from the external storage circuitry (not shown) by way of external data bus conductors 36 and data pins 31. Data processing system 10 then internally increments the program counter register PC.

During the second bus cycle of the "RTS" instruction, the value $FE03 (i.e. the present value stored in the program counter register PC) is driven by data processing system 10 onto the external address bus conductors 35 by way of address pins 30. The value $FF (i.e. the opcode of the next sequential instruction) is received back by data processing system 10 from the external storage circuitry (not shown) by way of external data bus conductors 36 and data pins 31.

Thus for the first two bus cycles of the "RTS" instruction, use of the external address bus conductors 35, the address pins 30, the external data bus conductors 36, and the data pins 31 is required. Since use of the external address bus 35 is required, the values driven by the address pins 30 are not "frozen" in their respective logic state, but instead reflect the changing values on the internal address bus 24. Since use of the external data bus 36 is required, the values driven by the data pins 31 are not "frozen" in their respective logic state, but instead reflect the changing values on the internal data bus 26. As a result, for the first two bus cycles of the "RTS" instruction, the response (see FIG. 5) of one embodiment of data processing system 10 is the same as the response (see FIG. 4) of the prior art data processing system.

However, for the third, fourth, and fifth bus cycles of the "RTS" instruction, the response (see FIG. 5) of data processing system 10 is significantly different from the response (see FIG. 4) of the prior art data processing system. The third, fourth, and fifth bus cycles of the "RTS" instruction do not require use of the external address bus conductors 35, the address pins 30, the external data bus conductors 36, or the data pins 31.

Referring to the third, fourth, and fifth bus cycles of the "RTS" instruction illustrated in FIG. 5, since use of the external address bus 35 is not required, the values driven by the address pins 30 in the present invention are "frozen" in their respective logic states, and thus the external address bus conductors 35 continue to be driven with the same logic states and do not reflect the changing values on the internal address bus 24. Since use of the external data bus 36 is not required, the values driven by the data pins 31 are "frozen" in their respective logic states, and thus the external data bus conductors 36 continue to be driven with the same logic states and do not reflect the changing values on the internal data bus 26. Thus without tri-stating the address pins 30 and the data pins 31, the present invention can reduce noise and power consumption by reducing the switching which takes place on external address bus 35 and external data bus 36.

The third, fourth, and fifth bus cycles of the "RTS" instruction for the prior art and the present invention will now be discussed in more detail. Again, the third, fourth, and fifth bus cycles do not require use of the external address bus 35 or the external data bus 36. The third, fourth, and fifth bus cycles are used to access address locations $00FD, $00FE, and $00FF, which are stack memory locations internal to data processing system 10.

During the third bus cycle of the "RTS" instruction, the value stored in the stack pointer register SP is incremented by data processing system 10, and thus use of the external address bus 35 and the external data bus 36 is not required.

Referring to FIG. 4, note that during the third bus cycle of the "RTS" instruction, the prior art data processing system drives the prior art address pins with the superfluous value $00FD, which happens to be the value of the prior art internal address bus during the third bus cycle. Likewise, the prior art data processing system drives the prior art data pins with the superfluous value $00, which happens to be the value of the prior art internal data bus during the third bus cycle.

Referring to FIG. 5, during the third bus cycle of the "RTS" instruction in the present invention, data processing system 10 (see FIG. 1) continues to drive the address pins 30 with the value $FE03, which is the most recent value driven by the address pins 30 during a bus cycle that required use of the external address bus 35. Thus the address pins 30 of the present invention continue to drive the previous logic states. And therefore the external address bus conductors 35 continue to be driven with the same logical value, and not with a different and unnecessary value from internal address bus 24.

Likewise, during the third bus cycle of the "RTS" instruction in the present invention, data processing system 10 (see FIG. 1) continues to drive the data pins 31 with the value $FF, which is the most recent value driven by the data pins 31 during a bus cycle that required use of the external data bus 36. Thus the data pins 31 of the present invention continue to drive the previous logic states. And therefore the external data bus conductors 36 continue to be driven with the same logical value, and not with a different and unnecessary value from internal data bus 26.

The fourth and fifth bus cycles of the "RTS" instruction are used to access address locations internal to data processing system 10. Thus during the fourth and fifth bus cycles, use of the external address bus 35 and the external data bus 36 is not required. The two accesses to the internal address locations are used to retrieve the return address ($FC04) which is subsequently loaded into the program counter register PC.

Referring to FIG. 4, during the fourth bus cycle of the "RTS" instruction, the prior art data processing system drives the prior art address pins with the superfluous value $00FE. The value $00FE happens to be the value of the prior art internal address bus during the fourth bus cycle. During the fifth bus cycle of the "RTS" instruction, the prior art data processing system drives the prior art address pins with the superfluous value $00FF. The value $00FF happens to be the value of the prior art internal address bus during the fifth bus cycle.

Similarly, the prior art data processing system drives the prior art data pins with the superfluous value $FC during the fourth bus cycle, and with the superfluous value $04 during the fifth bus cycle. The value $FC happens to be the value of the prior art internal data bus during the fourth bus cycle, and the value $04 happens to be the value of the prior art internal data bus during the fifth bus cycle.

Referring to FIG. 5, during the fourth and fifth bus cycles of the "RTS" instruction in the present invention, data processing system 10 (see FIG. 1) continues to drive the address pins 30 with the value $FE03, which is the most recent value driven by the address pins 30 during a bus cycle that required use of the external address bus 35. Thus the address pins 30 of the present invention continue to drive the previous logic states. And therefore the external address bus conductors 35 continue to be driven with the same logical value, and not with a different and unnecessary value from internal address bus 24.

Likewise, during the fourth and fifth bus cycles of the "RTS" instruction in the present invention, data processing system 10 (see FIG. 1) continues to drive the data pins 31 with the value $FF, which is the most recent value driven by the data pins 31 during a bus cycle that required use of the external data bus 36. Thus the data pins 31 of the present invention continue to drive the previous logic states. And therefore the external data bus conductors 36 continue to be driven with the same logical value, and not with a different and unnecessary value from internal data bus 26.

For the "RTS" instruction, the values driven by address pins 30 of the present invention (see FIG. 5) are sometimes the same as, and sometimes different from, the values driven by the prior art address pins (see FIG. 4). Likewise, the values driven by data pins 31 of the present invention (see FIG. 5) are sometimes the same as, and sometimes different from, the values driven by the prior art data pins (see FIG. 4). The values driven are the same during bus cycles that required use of the external address bus 35; the values driven may be different during bus cycles that do not required use of the external address bus 35.

The present invention can reduce the switching which takes place on external bus conductors, such as external address bus conductors 35 and external data bus conductors 36. For example, for the "RTS" instruction, the present invention reduces the total amount of switching which takes place on external bus conductors between bus cycles two and three, bus cycles three and four, and bus cycles four and five. Thus by reducing the overall amount of switching which takes place on external bus conductors, the present invention can reduce noise and power consumption.

Although the example in FIGS. 3-5 illustrates only two instructions, namely "STA" and "RTS", the present invention may improve noise performance and reduce power consumption for any instructions which have one or more bus cycles for which use of external conductors is not required.

FIG. 2 illustrates one embodiment of a portion of port circuitry and external bus control circuitry 14 of FIG. 1. The portion of port circuitry and external bus control circuitry 14 illustrated in FIG. 2 is used to determine whether or not the values driven by the integrated circuit pins 30-31 are "frozen" in their previous logic state, and whether or not the integrated circuit pins 32-34 are driven to a predetermined inactive logic state.

The circuitry illustrated in FIG. 2 performs a freeze or hold of the values driven by address pins 30 and data pins 31 when: (1) internal read visibility is disabled; and (2) the instruction bus cycle does not require use of the external address bus 35 and the external data bus 36. In some embodiments of the present invention, an instruction bus cycle does not require use of the external buses 35 and 36 when an effective address calculation is performed, or when the memory location accessed is internal to data processing system 10.

Control register 54 has a user programmable Internal Read Visibility (IRV) control bit 56. If IRV control bit 56 is asserted (IRV=I), then internal read visibility is enabled and address pins 30 and data pins 31 are never "frozen". If IRV control bit 56 is negated (IRV=0), then internal read visibility is disabled and address pins 30 and data pins 31 may be "frozen" during instruction bus cycles which not require use of the external address bus 35 and the external data bus 36.

In all normal operating modes, the user should ensure that the IRV control bit 56 is negated in order to reduce noise and power consumption during normal operation. However, during emulation or test, the IRV control bit 56 may be asserted in order to increase observability by driving the external address bus 35 with the value from the internal address bus 24, and by driving the external data bus 36 with the value from the internal data bus 26.

Note that for some embodiments of the present invention, the reset state of the IRV control bit 56 may vary. For example, in one embodiment of the present invention, if data processing system 10 comes out of reset in any type of test mode, the IRV control bit 56 comes out of reset to its asserted state (i.e. internal read visibility enabled). And if data processing system 10 comes out of reset in any non-test mode, such as a normal operating mode, then the IRV control bit 56 comes out of reset to its negated state (i.e. internal read visibility disabled). Of course the user is always free to change between enabling and disabling internal read visibility by writing a different value to the IRV control bit 56. Control register 54, and thus IRV control bit 56, can be read and written by way of internal address bus 24 and internal data bus 26.

Address map decode circuitry 50 decodes the address value from internal address bus 24 in order to determine whether the bus cycle accesses an address which is internal or external to data processing system 10. All addresses must be either internal or external to data processing system 10.

Opcode decode and instruction cycle count circuitry 52 decodes the opcode of each instruction and determines which bus cycles, if any, of the instruction do not require an access to any memory location, either internal or external. For example, instruction bus cycles which only perform effective address calculations do not require an access to any memory location.

The output of OR-gate 64 is a logical one if either: (1) address map decode circuitry 50 determines that the new bus cycle accesses an address which is internal to data processing system 10; or (2) opcode decode and instruction cycle count circuitry 52 decodes the opcode of the instruction and determines that the new bus cycle of the instruction does not require an access to any memory location. For example, instruction bus cycles which only perform effective address calculations do not require an access to any memory location.

Since each instruction may include one or more bus cycles, opcode decode and instruction cycle count circuitry 52 must decode each instruction and must also keep track of which bus cycle of an instruction is currently being executed. For example, the "STA" instruction and the "RTS" instruction illustrated in FIG. 3 each have six instruction bus cycles.

The output of NAND-gate 66 is a logical zero if: (1) the output of OR-gate 64 is a logical one; and (2) internal read visibility is disabled (i.e. IRV control bit 56 equals zero). AND-gate 68 functions as a timing gate. The input to AND-gate 68 from internal control bus 28 is a timing signal which enables the output of NAND-gate 66 to be passed through to the output of AND-gate 68. In one embodiment of the present invention, the input to AND-gate 68 from internal control bus 28 is an address strobe signal which indicates that the output of NAND-gate 66 accurately reflects the current bus cycle.

If the output of NAND-gate 66 is a logical zero, the output of AND-gate 68 is a logical zero when the timing signal is asserted. And if the output of NAND-gate 66 is a logical one, the output of AND-gate 68 is a logical one when the timing signal is asserted. Whenever the timing signal is negated, the output of AND-gate 68 is a logical zero.

When the output of AND-gate 68 is a logical zero, address and data latches 60 do not latch a new address value from internal address bus 24 or a new data value from internal data bus 26. Instead, address and data latches 60 continue to drive the address pins 30 and the data pins 31 with the same logic states. Thus the address pins 30 and the data pins 31 are "frozen" in their previous logic state. Thus the external address bus conductors 35 and the external data bus conductors 36 continue to be driven with the same logic states.

In the embodiment of the present invention illustrated in FIG. 2, after the output of AND-gate 68 transitions from a logical zero to a logical one, address and data latches 60 store a new address value from internal address bus 24 and store a new data value from internal data bus 26. Address and data latches 60 thus drive the address pins 30 with the newly latched address value, and drive the data pins 31 with the newly latched data value. Thus the address pins 30 and the data pins 31 are not "frozen" in their previous logic state. Thus the external address bus conductors 35 and the external data bus conductors 36 are driven with the newly latched values.

When the output of AND-gate 68 is a logical zero, control and chip select latches 62 do not latch new control and chip select values from internal control bus 24. Instead, control and chip select latches 62 drive the control pins 32, the chip select pins 33, and the other pins 34 with their respective inactive logic states. Thus control pins 32, chip select pins 33, and other pins 34 are not "frozen" in their previous logic state, but are instead driven to their respective inactive logic states. Thus the external control conductors 37, the external chip select conductors 38, and the other pin conductors 39 are driven to their respective inactive logic states.

For example, in one embodiment of the present invention, control pins 32 include an active low $\overline{READ}$ pin 27 and an active low $\overline{WRITE}$ pin 29, both of which utilize a logic level one for their inactive state. Thus, when the output of AND-gate 68 is a logical zero, control and chip select latches 62 drive the $\overline{READ}$ pin 27 and the $\overline{WRITE}$ pin 29 with their inactive logic state, a logic level one.

After the output of AND-gate 68 transitions from a logical zero to a logical one, control and chip select latches 62 store new control and chip select values from internal control bus 28. Control and chip select latches 62 thus drive the control pins 32, the chip select pins 33, and the other pins 34 with the newly latched values. Thus the control pins 32, the chip select pins 33, and the other pins 34 are not driven to their respective inactive logic states. Thus the external control conductors 37, the external chip select conductors 38, and the other pin conductors 39 are driven with the newly latched values.

In summation, the present invention can reduce noise and power consumption by reducing the switching which takes place on external bus conductors. In addition, the present invention can be used with peripheral integrated circuits which will not function properly if they are coupled to tri-stated outputs. The present invention also enables a customer to completely eliminate any external bus activity (and the associated noise and power consumption) by using software which operates solely out of internal memory.

Alternate embodiments of the present invention may have fewer, more, or different pins than those illustrated in FIG. 1 and FIG. 2. Alternate embodiments of the present invention may or may not have external conductors 35–39 coupled to integrated circuit pins 30–34. Alternate embodiments of the present invention may multiplex various functions on pins 30–34. For example, some of data pins 31 may selectively be used as additional address pins.

Referring to FIG. 1, data processing system 10 can be any type of data processing system. FIG. 1 is just one possible embodiment of a data processing system 10. There are many, many other possible embodiments. In some embodiments of the present invention, data processing system 10 may be implemented using a plurality of integrated circuits which are interconnected in some manner by conductors. Alternately, data processing system 10 may be implemented as a single integrated circuit, for example, a microprocessor or a microcontroller.

Referring to FIG. 2, in alternate embodiments of the present invention, any circuitry could be used to implement circuitry 50, 52, 54, 58, 60, and 62. Address and data latches 60 may be implemented as any type of storage circuit (e.g. edge-sensitive latches, level-sensitive latches, any type of flip-flop, etc.).

In alternate embodiments of the present invention, control register 54 can be any number of bits. IRV control bit 56 could be a bit field of one or more bits at any bit location(s) in control register 54. Alternately, other embodiments of the present invention may use an external pin (not shown) in place of IRV control bit 56. Also, a mask option may instead be used, although a mask option would not allow any user programmability after the manufacturing process.

In some embodiments of the present invention, the initial decoding of each instruction is performed by decode circuitry (not shown) which is part of CPU 12. The decode circuitry (not shown) in CPU 12 then transfers control signals to opcode decode and instruction cycle count circuitry 52 by way of internal control bus 28. Opcode decode and instruction cycle count circuitry 52 then uses these control signals to determine how many bus cycles the present instruction has, and which, if any, of the instruction bus cycles are used to perform internal functions that do not require use of the external buses 35 and 36. In yet other embodiments of the present invention, opcode decode and instruction cycle count circuitry 52 may actually be part of CPU 12, and one or more control signals may be transferred from opcode decode and instruction cycle count circuitry 52 to port circuitry and external bus control circuitry 14.

It is to be understood, therefore, that this invention is not limited to the particular forms illustrated and that the appended claims cover all modifications that do not depart from the spirit and scope of this invention.

We claim:

1. A method for controlling an integrated circuit terminal in a data processing system, comprising the steps of:
   if the data processing system is in a first mode, determining if a first external bus access is required during a first bus cycle;
   if the data processing system is in the first mode, determining if a second external bus access is required during a second bus cycle;
   if the data processing system is in the first mode, and if the first external bus access is required during the first bus cycle, driving the integrated circuit terminal with a first value during the first bus cycle;
   if the data processing system is in the first mode, and if the second external bus access is required during the second bus cycle, driving the integrated circuit terminal with a second value during the second bus cycle; and
   if the data processing system is in the first mode, and if no external bus access is required during the second bus cycle, driving the integrated circuit terminal with the first value during the second bus cycle;
   if the data processing system is in a second mode, and if the first external bus access is required during the first bus cycle, driving the integrated circuit terminal with the first value during the first bus cycle;
   if the data processing system is in the second mode, and if the second external bus access is required during the second bus cycle, driving the integrated circuit terminal with the second value during the second bus cycle; and
   if the data processing system is in the second mode, and if no external bus access is required during the second bus cycle, driving the integrated circuit terminal with the second value during the second bus cycle.

2. A method as in claim 1, further comprising the step of:
   determining when the data processing system is in the first mode based upon a control value in a user programmable control register.

3. A method as in claim 1, further comprising the steps of:
   receiving an instruction;
   decoding the instruction to determine whether the first bus cycle requires a first memory access and to determine whether the second bus cycle requires a second memory access.

4. A method as in claim 3, wherein said step of determining if the first external bus access is required comprises the steps of:
   receiving at least a portion of a first address at a decode circuit, the first address being associated with the first bus cycle;
   decoding the at least the portion of the first address; and
   determining whether a first location corresponding to the first address is located external to the data processing system;
   and wherein said step of determining if the second external bus access is required comprises the steps of:
   receiving at least a portion of a second address at the decode circuit, the second address being associated with the second bus cycle;
   decoding the at least the portion of the second address; and
   determining whether a second location corresponding to the second address is located external to the data processing system.

5. A method as in claim 1, further comprising the step of:
   driving a second integrated circuit terminal with a predetermined inactive logic state during the second bus cycle if the data processing system is in the first mode, and if no external bus access is required during the second bus cycle.

6. An apparatus for controlling an integrated circuit terminal in a data processing system, comprising:
   an internal address bus having a plurality of address signals;
   address decode circuitry, coupled to said internal address bus for receiving at least one of the plurality of address signals, said address decode circuitry determining whether a first memory access during a first bus cycle is one of an internal memory access and an external memory access, said address decode circuitry determining whether a second memory access during a second bus cycle is one of the internal memory access and the external memory access;
   a storage circuit for storing a control value, the control value determining whether the data processing system is in one of a first mode and a second mode; and
   an integrated circuit terminal, coupled to said address decode circuitry, coupled to said storage circuit, and coupled to one of the plurality of address signals, the one of the plurality of address signals having a first address value during the first bus cycle and having a second address value during the second bus cycle, said integrated circuit terminal driving the first address value during both the first and second bus cycles if the data processing system is in the first mode and if the second memory access is the internal memory access. said integrated circuit terminal driving the first address value during the first bus cycle and driving the second address value during the second bus cycle ff the data processing system is in the second mode and if the second memory access is the internal memory access.

7. An apparatus as in claim 6, wherein said storage circuit is a user programmable register control bit.

8. An apparatus as in claim 6, further comprising:
   instruction decode circuitry, coupled to said integrated circuit terminal, for determining which instruction is being executed.

9. An apparatus as in claim 8, wherein said instruction decode circuitry determines when the first bus cycle is being performed and when the second bus cycle is being performed.

10. An apparatus as in claim 6, further comprising:
    an address storage circuit, coupled to said internal address bus and coupled to said integrated circuit terminal, said address storage circuit storing the first address value during both the first and second bus cycles if the data processing system is in the first mode, and if the second memory access is the internal memory access.

11. An apparatus as in claim 6, further comprising:
    an internal data bus having a plurality of data signals; and
    a second integrated circuit terminal, coupled to said storage circuit and coupled to one of the plurality of data signals, the one of the plurality of data signals having a first data value during the first bus cycle and having a second data value during the second bus cycle, said second integrated circuit terminal driving the first data value during both the first and second bus cycles if the data processing system is in the first mode, and if the second memory access is the internal memory access.

12. An apparatus as in claim 6, further comprising:

an internal control signal having a predetermined inactive logic state; and a third integrated circuit terminal, coupled to said storage circuit and coupled to said internal control signal, said third integrated circuit terminal driving the predetermined inactive logic state during the second bus cycle if the data processing system is in the first mode, and if the second memory access is the internal memory access.

13. An integrated circuit, comprising:

an internal address bus having a plurality of address signals, the plurality of address signals having a first address value during a first bus cycle and having a second address value during a second bus cycle;

an internal data bus having a plurality of data signals, the plurality of data signals having a first data value during the first bus cycle and having a second data value during the second bus cycle;

address decode circuitry, coupled to said internal address bus for receiving the plurality of address signals, said address decode circuitry determining whether a first memory access during the first bus cycle is one of an internal memory access and an external memory access, said address decode circuitry determining whether a second memory access during the second bus cycle is one of the internal memory access and the external memory access;

a storage circuit for storing a control value, the control value determining whether the data processing system is in one of a first mode and a second mode;

a plurality of address integrated circuit terminals, coupled to said internal address bus, coupled to said address decode circuitry, and coupled to said storage circuit, said plurality of address integrated circuit terminals driving the first address value during both the first and second bus cycles ff the data processing system is in the first mode, and if the second memory access is the internal memory access; and a plurality of data integrated circuit terminals, coupled to said internal data bus, coupled to said address decode circuitry, and coupled to said storage circuit, said plurality of data integrated circuit terminals driving the first data value during both the first and second bus cycles if the data processing system is in the first mode, and if the second memory access is the internal memory access;

wherein when the data processing system is in the second mode, said plurality of address circuit terminals drives the first address value during the first bus cycle and drives the second address value during the second bus cycle, and said plurality of data integrated circuit terminals drives the first data value during the first bus cycle and drives the second data value during the second bus cycle.

14. An apparatus as in claim 13, wherein said storage circuit is a user programmable register control bit.

15. An apparatus as in claim 13, further comprising:

instruction decode and cycle count circuitry, coupled to said plurality of address integrated circuit terminals and coupled to said plurality of data integrated circuit terminals, said instruction decode and cycle count circuitry determining which instruction is being executed and determining which bus cycle of the instruction is being executed.

16. An apparatus as in claim 13, further comprising:

a plurality of address storage circuits, coupled to said internal address bus and coupled to said plurality of address integrated circuit terminals, said plurality of address storage circuits storing the first address value during both the first and second bus cycles if the data processing system is in the first mode, and if the second memory access is the internal memory access; and a plurality of data storage circuits, coupled to said internal data bus and coupled to said plurality of data integrated circuit terminals, said plurality of data storage circuits storing the first data value during both the first and second bus cycles if the data processing system is in the first mode, and if the second memory access is the internal memory access.

17. An apparatus as in claim 13, further comprising:

an internal control signal having a predetermined inactive logic state; and a control integrated circuit terminals, coupled to said storage circuit and coupled to said internal control signal, said control integrated circuit terminal driving the predetermined inactive logic state during the second bus cycle if the data processing system is in the first mode, and if the second memory access is the internal memory access.

* * * * *

UNITED STATES PATENT AND TRADEMARK OFFICE
CERTIFICATE OF CORRECTION

PATENT NO. : 5,457,802
DATED : October 10, 1995
INVENTOR(S) : Michael I. Catherwood, Brian M. Millar, Linda R. Nuckolls It is certified that error appears in the above-indentified patent and that said Letters Patent is hereby corrected as shown below:

Claim 6, column 16, line 38;
    change "ff" to --if--.

Claim 13, column 17, line 41;
    change "ff" to --if--.

Signed and Sealed this

Twenty-seventh Day of February, 1996

Attest:

BRUCE LEHMAN

Attesting Officer     Commissioner of Patents and Trademarks